G. W. BLAIR.
MANUFACTURE OF GLASS TILES AND SIMILAR ARTICLES.
APPLICATION FILED MAR. 6, 1905.

959,423.

Patented May 24, 1910.
2 SHEETS—SHEET 1.

WITNESSES
Thomas W. Bakewell
Warren W. Swartz

INVENTOR
George W. Blair

G. W. BLAIR.
MANUFACTURE OF GLASS TILES AND SIMILAR ARTICLES.
APPLICATION FILED MAR. 6, 1905.

959,423.

Patented May 24, 1910.
2 SHEETS—SHEET 2.

WITNESSES
Thomas W. Bakewell
Warren W. Swartz

INVENTOR
George W. Blair

UNITED STATES PATENT OFFICE.

GEORGE W. BLAIR, OF PITTSBURG, PENNSYLVANIA, ASSIGNOR OF FOUR-TENTHS TO F. G. WALLACE, OF PITTSBURG, PENNSYLVANIA, ONE-TENTH TO CHARLES E. VOITLE, AND ONE-TENTH TO JAMES D. JOHNSTON, BOTH OF JEANNETTE, PENNSYLVANIA.

MANUFACTURE OF GLASS TILES AND SIMILAR ARTICLES.

959,423.  Specification of Letters Patent.  Patented May 24, 1910.

Application filed March 6, 1905.  Serial No. 248,489.

*To all whom it may concern:*

Be it known that I, GEORGE W. BLAIR, of Pittsburg, Allegheny county, Pennsylvania, have invented a new and useful Improvement in the Manufacture of Glass Tiles and Similar Articles, of which the following is a full, clear, and exact description, reference being had to the accompanying drawings, forming part of this specification, in which—

Figure 1:
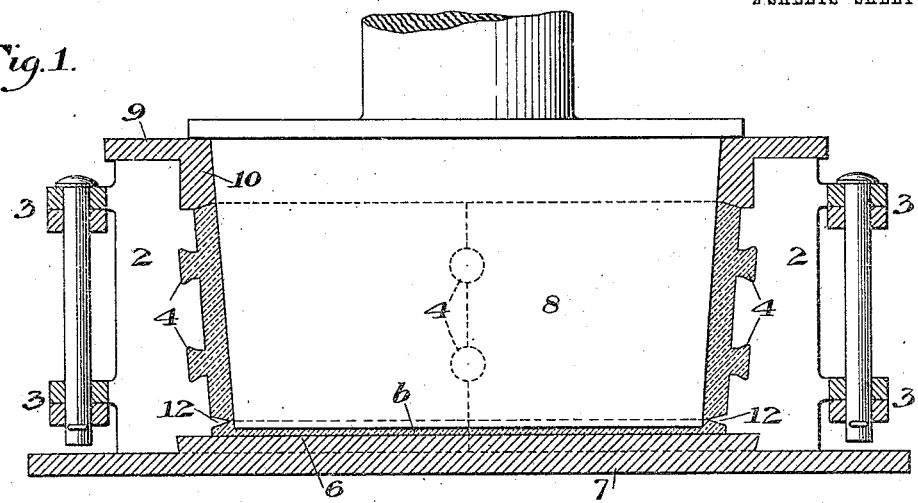
Figure 2:
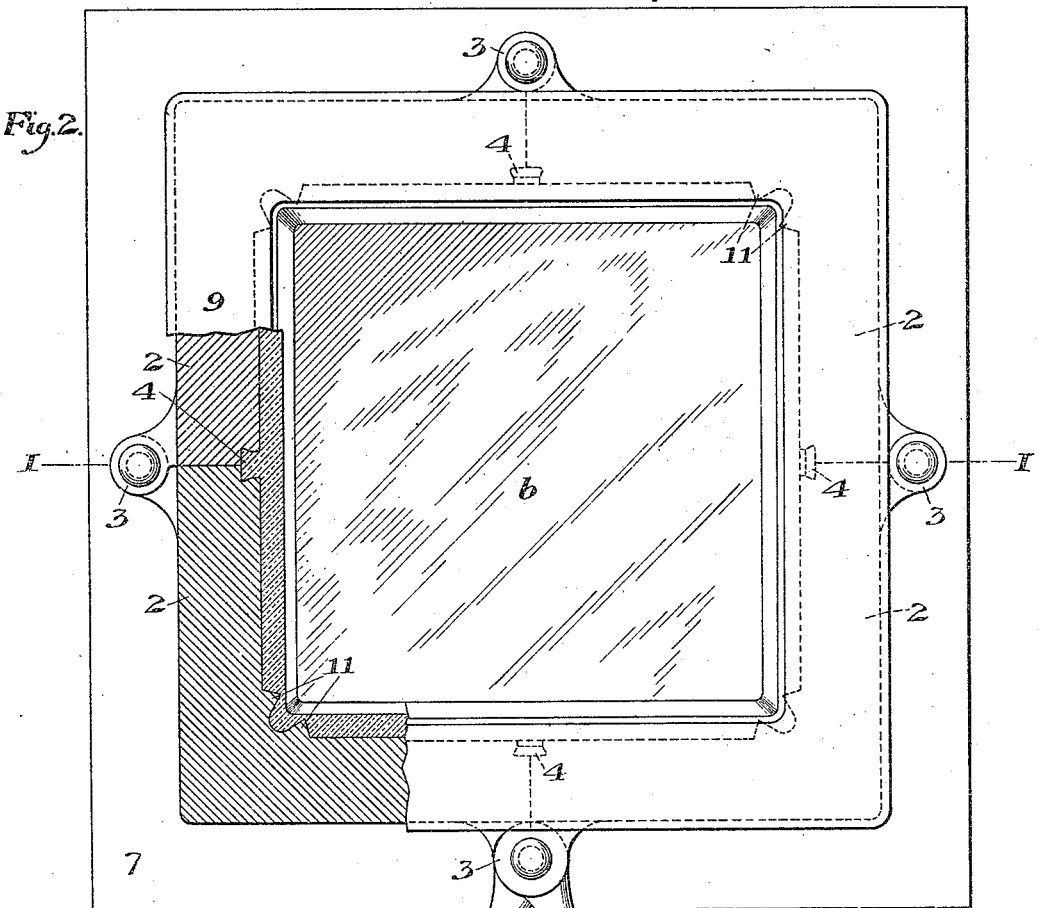
Figure 3:
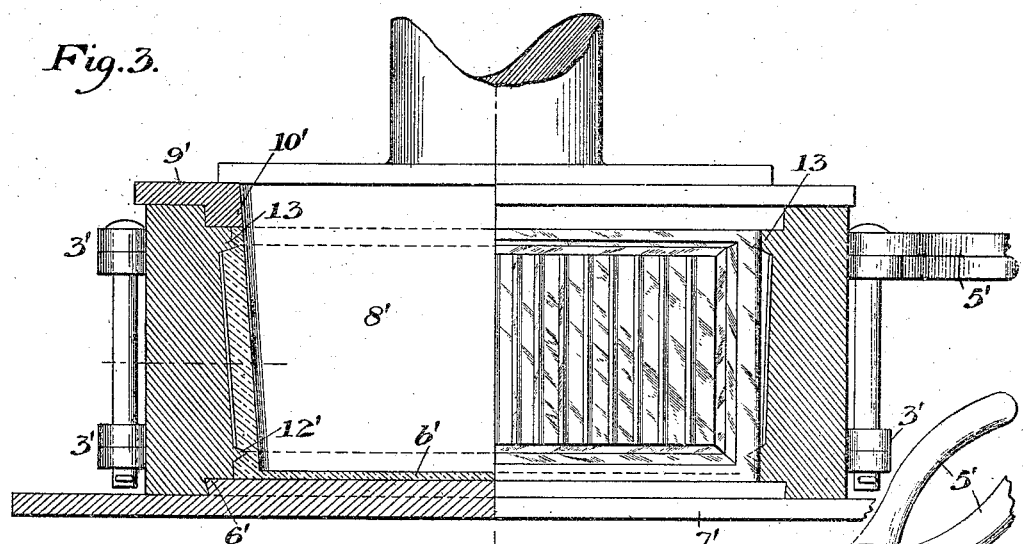
Figure 4:
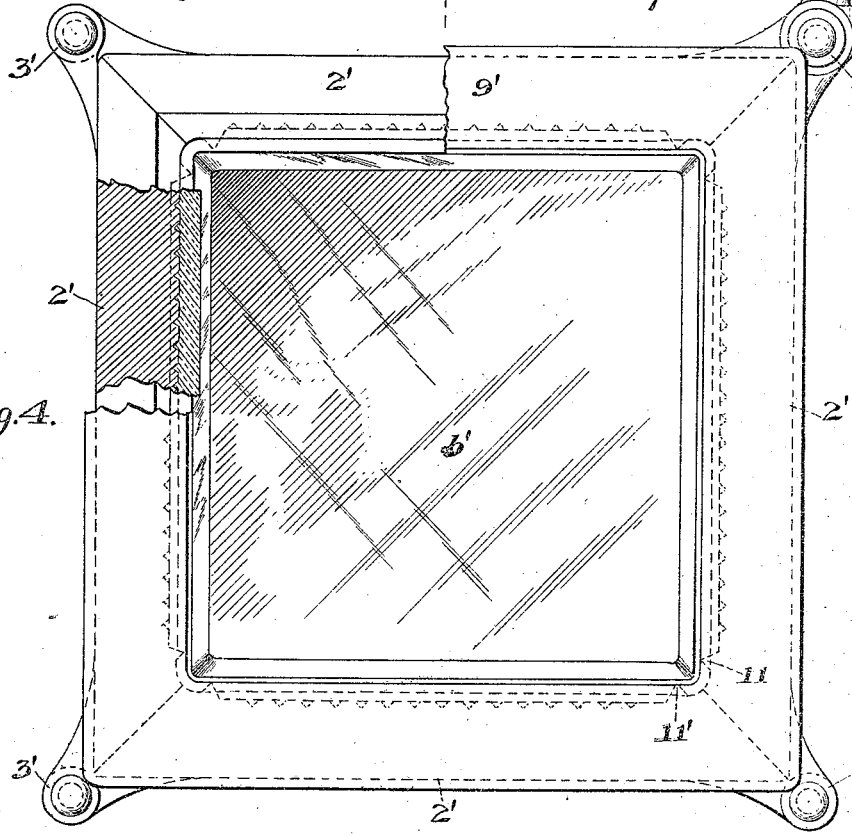

Figure 1 is a vertical section showing the pressed glass blank in the mold, the section being on the line I—I of Fig. 2; Fig. 2 is a top plan view of the mold partly broken away, the plunger being removed; Figs. 3 and 4 show modifications, Fig. 3 showing one half of the mold with the glass article in section, and the other half of the mold in section with the article in elevation, Fig. 4 being a plan view partly broken away.

In the drawings, referring to the preferred form of Figs. 1 and 2, I show a square mold with each side 2 divided centrally and vertically and provided with hinges 3. At the line of juncture of the two parts of each side undercut recesses 4 are formed, one-half in each portion of the side of the mold. I have shown these recesses as of knob form, and two in number with projecting lips. The form of the knob or projection may be varied, so long as undercut faces are presented. By forming these undercut faces, one-half in each portion of the mold, the mold may be opened without bending or distorting them. The hinge at one side is provided with handles 5, by which the sides of the mold may be successively swung open to relieve the article. The bottom portions of the sides of the mold are recessed to fit around the upwardly projecting portion 6 of the mold bottom 7, this portion 6 being of square form corresponding to the shape of the mold. The inner faces of the mold cavity are inclined downwardly and inwardly, so that the faces are at an angle to the path of movement of the plunger 8. The mold is provided with a mold-ring 9 having a downwardly projecting ring 10 which fits upon inner shoulders in the mold sides and projects inwardly, being preferably beveled upwardly and inwardly on its under face. When the mold is closed upon the base, and the mold-ring inserted, the proper quantity of glass is dropped into the mold and the plunger is then forced down. The glass is thus forced up to form the sides of the article and is pressed into the undercut recesses to form the securing knobs, its upward flow being stopped by the inner projection on the mold-ring. The excess glass is forced into the space beneath the bottom of the plunger and constitutes a flat piece $b$ of glass, the thickness of which depends on the amount of glass put into the mold. When the mold is open the hinge portions in turning will free themselves from the under-cut projections. In order to provide for severing the sides of the pressed glass blank, each of which forms a tile, from each other and from the bottom, I provide the mold portions with inwardly projecting sharpened ribs 11 at each corner, which form vertical recesses in the hollow glass blank, so that the tiles may be easily broken apart along these weakened lines. For the same purpose the mold sides are provided near the bottom with a rib 12, so that the bottom $b$ of the hollow blank may be broken off and thrown into the cullet kettle. By making the plunger in the shape of the frustum of a pyramid and correspondingly inclining the flat faces of the mold, the plungers will draw easily and yet form tiles of equal thickness throughout.

In the form shown, in Figs. 3 and 4, a circumferential rib 13 is formed around the sides of the mold near the top to weaken the glass at this point, similarly to the weakening around the bottom. In this case I show the mold sides as having vertically-extending recesses which form rearwardly projecting ribs on the blank, and as these are not undercut I show the hinges 3′ situated at the corners instead of at the middle of the sides as in the first form. In other regards, the molds are substantially similar and similar parts are indicated by similar numerals with the prime mark applied.

The advantages of my invention result from the simultaneous forming of a series of tiles in a cheap and rapid manner. The tiles are formed vertically on edge, the poorer portion of the glass is formed at the bottom, which is broken off, so that the tiles are of excellent quality, and are easily broken apart and ground upon their edges.

Where the tiles are formed flatwise, in the ordinary manner, the glass at the center of the tile is not worked properly, so that rings appear in this central portion, which injure its appearance. The shear mark of the shear which cuts off the glass fed into the mold also appears. In my process, on the contrary, all of these marks are located in the refuse bottom portion, and the surface of the tiles is of fine quality and finish.

The mold may be varied as to the number of flat sides, the shape of the recesses to form the rear projections on the tiles, the position of the hinges, etc., without departing from my invention.

The mold may be made of sufficient depth so that the length of the tiles will extend vertically instead of horizontally, as in the form shown.

I claim:—

1. The method of making tiles, consisting in pressing a hollow blank with flat finished sides having external projections and a closed bottom, and then severing the sides; substantially as described.

2. The method of forming tiles, consisting in pressing a hollow blank with flat finished sides having external projections and a closed bottom forming weakened portions in the glass extending vertically along the corners, and then severing the sides; substantially as described.

3. The method of making tiles, consisting in pressing a hollow blank with angular flat sides having external projections and a closed bottom forming weakened portions in the glass extending around the article near the bottom, and also extending vertically along the corner portions, and then severing the sides; substantially as described.

4. The method of making tiles, consisting in pressing a hollow blank with angular flat sides having external projections and a closed bottom, forming weakened portions in the glass extending around the article near the top and bottom, and also extending vertically along the corner portions, and then severing the sides; substantially as described.

5. A glass mold for forming tiles, or similar articles, having hinged sides with recessed interior finishing faces, and a closed bottom said mold having projections arranged to weaken the corners of the hollow article; substantially as described.

6. A mold for forming tiles, or similar articles, having hinged sides with inner finishing faces, a closed bottom and projecting ribs arranged to form weakened portions in the glass extending vertically along the corners and around the bottom; substantially as described.

7. A mold for forming tiles, or similar articles, having hinged sides with inner finishing faces, a closed bottom and projecting ribs arranged to form weakened portions in the glass extending vertically along the corners and around the top and bottom; substantially as described.

8. A mold for forming tiles, said mold having a plunger and sides inclined to the line of movement of the plunger the mold sides having flat finishing faces; substantially as described.

9. The method of making tiles, consisting in pressing a hollow article having finished flat sides and angular corners, and then severing the sides; substantially as described.

10. The method of making tiles, consisting in pressing a hollow blank having a closed bottom and flat sides with angular corners, and then severing the sides from each other and from the bottom; substantially as described.

11. The method of making tiles, consisting in pressing within a forming mold a glass blank of hollow form having flat finished side portions connected together by angular corner portions, having vertical weakening recesses between the corner portions and the side portions, and having a bottom connected to the side portions provided with a horizontal weakening recess between the bottom and each side portion; and then removing the blank from the mold and severing the sides from the bottom and from each other along said weakening recesses, substantially as described.

In testimony whereof, I have hereunto set my hand, March 1, 1905.

GEORGE W. BLAIR.

Witnesses:
H. M. CORWIN,
THOMAS W. BAKEWELL.